FULL-WAVE SINGLE-ENDED SYNCHRONOUS RECTIFIER

Filed Dec. 15, 1960 3 Sheets-Sheet 1

INVENTORS
JAMES G. HOLBROOK
BENJAMIN O. LANGE
BY George Sullivan
Agent

INVENTORS
JAMES G. HOLBROOK
BENJAMIN O. LANGE
BY George C. Sullivan
Agent

FULL-WAVE SINGLE-ENDED SYNCHRONOUS RECTIFIER

INVENTORS
JAMES G. HOLBROOK
BENJAMIN O. LANGE
BY George C. Sullivan
Agent

United States Patent Office 3,036,273
Patented May 22, 1962

3,036,273

FULL-WAVE SINGLE-ENDED SYNCHRONOUS RECTIFIER

James G. Holbrook, Palo Alto, and Benjamin O. Lange, Mountain View, Calif., assignors to Lockheed Aircraft Corporation, Burbank, Calif.

Filed Dec. 15, 1960, Ser. No. 75,978
2 Claims. (Cl. 329—50)

The present invention relates to a rectifier and more particularly to a polarity sensitive synchronous rectifier having a rapid response rate and sensitive to low frequencies.

Prior methods for performing full wave rectification have been by means of push-pull amplifier output stages and by means of center tapped isolation transformers. These prior systems have had a tendency to be bulky and somewhat complex and nonresponsive at low frequencies.

The present invention obviates the disadvantages of these prior devices in that a reference or carrier signal is used to trigger a switching circuit such that the input to the switching circuit, which is the modulated carrier signal, is rectified. Since the switching circuit is responsive to the carrier signal and the input to the switching circuit is the modulated carrier signal there is synchronous rectification and the output of the switching circuit is indicative of the polarity of the modulated carrier signal. Capacitors are provided in series with respective switches of a switching circuit and with the output load. These capacitors are oppositely charged at alternate half cycles of the carrier frequency and have a time constant which is relatively large with respect to the load and small with respect to the source. Since the source (amplifier of modulated carrier frequency) has a low impedance, with a resulting small time constant, the condensers charge and discharge quickly and therefore correspond almost instantaneously with the variations of the input voltage envelope. The output load, however, has a large impedance as compared with the capacitance of the capacitors and therefore the exponentially decreasing voltage of the capacitors when they discharge through this high impedance output load is relatively small which obviates the necessity of a filter circuit. Since the output time constant may be relatively large, the bandwidth to which the device is responsive is narrow which results in discrimination against any frequency other than the synchronous carrier frequency. If there is polarity reversal of the modulated carrier frequency the capacitors are oppositely charged but the switches are actuated by the unmodulated carrier frequency (which does not have a polarity reversal) and the current through the load is therefore reversed which indicates the reversal of polarity.

An object of the present invention is to provide a single-ended full-wave rectifier which does not require a center tapped transformer.

Another object of the present invention is to provide a highly reliable and inexpensive synchronous rectifier.

Another object is to provide a polarity sensitive synchronous rectifier that is capable of rapidly following the envelope of a carrier frequency.

Another object is to provide a polarity sensitive synchronous rectifier that is sensitive to low frequencies.

The specific nature of the invention, as well as other objects, uses and advantages thereof, will clearly appear from the following description and from the accompanying drawing in which.

Like numerals designate like elements throughout the figures of the drawing.

Figure 1:
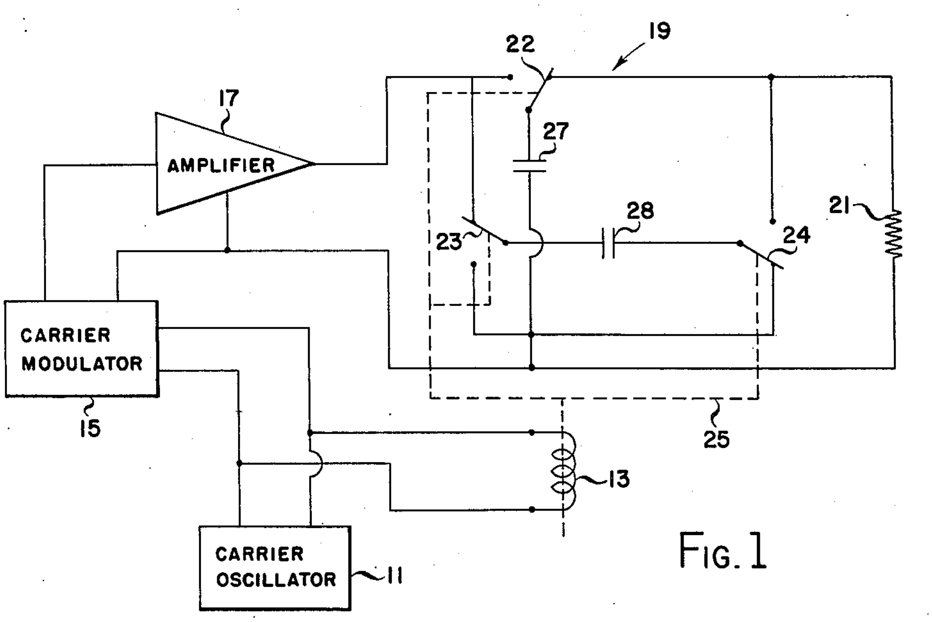
FIGURE 1 is a schematic illustration of the circuit of the present invention.

In FIGURE 1 is schematically illustrated the full-wave single-ended synchronous rectifier of the present invention wherein the output of carrier frequency oscillator 11 is applied to both solenoid 13 and the input of carrier frequency modulator 15. The output of carrier frequency modulator 15 is applied to the input of amplifier 17, the output of the amplifier is applied to the rectifier circuit 19 and the output of the rectifier circuit is applied across load 21. In one of present applications of this invention it is used as a rectifier in an infrared radiometer, which is used to measure the intensity of an infrared source, and when thus employed may be considered as a scanner carrier oscillator 11 having a carrier signal of approximately 70 cycles per second. Carrier modulator 15 may be considered as an infrared modulating source which amplitude modulates the carrier with a frequency of from about .1 to 5 cycles per second. It is to be understood that this is merely one of many ways in which the amplitude of a carrier frequency may be modulated and in which the envelope will have an independent frequency.

Figure 2A:
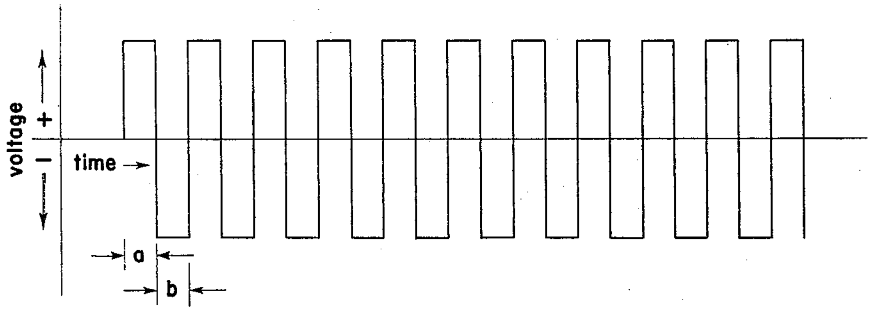
FIGURE 2A is a graph showing the carrier frequency.
Figure 2B:
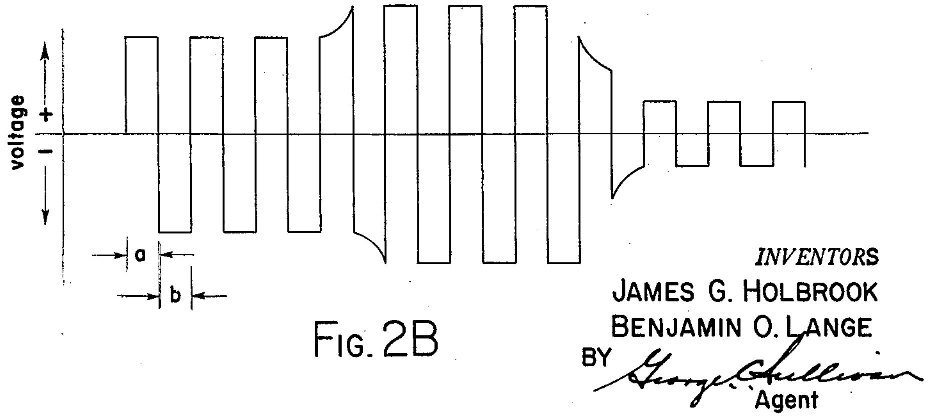
FIGURE 2B is a graph showing the amplitude modulated carrier frequency.

In order to more clearly illustrate the operation of the device, in FIGURE 2A is illustrated a 70 cycles per second square wave voltage which is the output of the carrier oscillator 11 and which is applied to solenoid 13 and to carrier modulator 15. In FIGURE 2B is illustrated the modulated carrier voltage which is the output of carrier modulator 15 and is applied to amplifier 17 the output of which has the same configuration but of greater amplitude than that of carrier modulator 15. As will hereinafter become more apparent, the current and/or voltage across load 21 will increase and decrease with corresponding amplitude changes of the modulated carrier frequency or in other words, the load current will follow the envelope of the modulated carrier frequency.

Figure 3A:
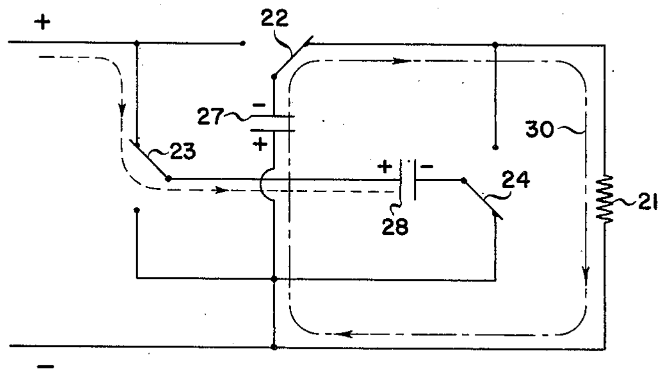
FIGURES 3A and 3B are schematic illustrations of the circuit of FIGURE 1 showing the circuit characteristics during each half cycle of operation.
Figure 3B:
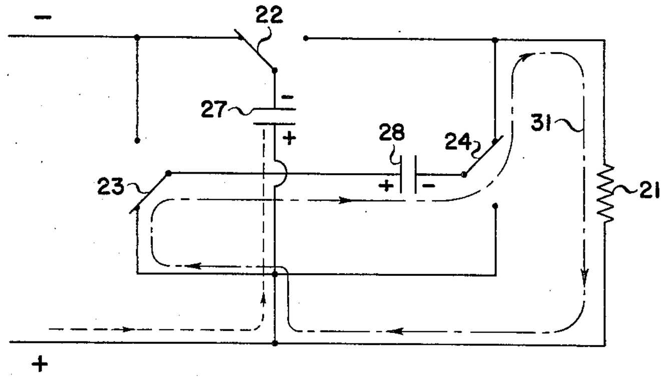

Rectifier circuit 19 includes switches 22, 23 and 24, which are all mechanically linked to the core of solenoid 13. This core and linkage are schematically illustrated by broken line 25. Capacitor 27 is connected in series with load 21 when switch 22 is in one position and in series with the output of amplifier 17 when switch 22 is in the other position. Capacitor 28 is connected in series with load 21 when switches 23 and 24 are in one position and in a series with the output of amplifier 17 when switches 23 and 24 are in the other position. In order to more clearly understand the operation of the rectifier circuit reference is directed to FIGURES 3A and 3B wherein FIGURE 3A shows the current flow and switch positions during the positive half cycle of the carrier and modulated carrier signals and corresponds with period of time "*a*" shown in FIGURES 2A and 2B. FIGURE 3B illustrates the current flow and switch positions during the negative half cycle of the carrier and modulated carrier signals and corresponds with the period of time "*b*" of FIGURES 2A and 2B. In FIGURE 3A the input polarity, the position of switches 22, 23 and 24 and the charge on capacitors 27 and 28 are as shown during the time period "*a*" of FIGURES 2A and 2B. Capacitor 28 is charged as shown since it is directly connected through switch 23 to the positive side of the modulated carrier signal whereas the other side of capacitor 28 is connected through switch 24 to the negative side of the modulated carrier signal. Capacitor 27 is charged as shown from the previous half-cycle of operation (similar to that of FIGURE 3B) and will discharge in series through switch 22 and load 21 in the direction shown by broken line 30. As illustrated in FIGURE 3B, during the second half cycle, that is, during the time period "*b*" of FIGURES 2A and 2B, the input polarity is opposite from that shown in FIGURE 3A. All switches are reversed during this negative half cycle of operation and therefore capacitor 28 discharges in the direction illustrated by broken line 31. It should be particularly noted that capacitors 27 and 28 retain the same charges irrespective of whether operation is during the positive or negative half cycles. This is because the input polarities change each one-half cycle and the position of switches 22, 23 and 24 also change their position during each one-half cycle and therefore one side of capacitor 28 is always connected to the positive side of the modulated carrier signal and one side of capacitor 27 is always connected to the negative side of the modulated carrier signal. From the polarity of capacitors 27 and 28 and the position of the switches it can be seen that the current during the positive as well as the negative half cycles (FIGURES 3A and 3B respectively) is always in the same direction through load 21. Therefore there is full wave synchronous rectification of the modulated carrier signal and the current through or the voltage drop across resistor 21 directly follows the potential of the modulated envelope.

The present invention is also polarity sensitive in that the current through load 21 reverses when the polarity of the modulated carrier signal reverses. This is because the position of switches 22, 23 and 24 is dependent only upon the polarity of the carrier signal and not upon the polarity of the modulated carrier signal. Therefore when the modulated carrier signal has a change in polarity, which may be considered as a 180° phase shift, capacitors 27 and 28 will be charged oppositely from that shown in FIGURES 3A and 3B. Therefore when these capacitors discharge, as determined by the polarity of the unchanged carrier signal, the current flows in the direction and the load will indicate this change of direction.

The time constants of capacitors 27 and 28 may be increased by increasing the load impedance or by increasing the capacitive reactance of these capacitors.

It is highly desirable for the capacitors to have a small time constant in order for the charge on the capacitors to rapidly follow the envelope of the modulated carrier frequency. In addition, it is also highly desirable for these capacitors to have a large time constant so the current output across the load will be nearly uniform, thereby rendering it unnecessary to filter, and to provide a narrow bandwidth which discriminates against most of the undesirable side band frequencies of the modulated carrier signal. One of the unique features of the present invention is that it is possible to have different time constants for each capacitor during alternate half cycles. This is because each capacitor is alternately connected to the amplifier and the output load. Since the time constant increases with increased load impedance and/or increase capacitive reactance, it is possible to employ a load having a large impedance and an amplifier having a small output impedance. This being the case, the time constant when connected to the load is large and the time constant when connected to the amplifier is small. In this manner the capacitors rapidly follow the modulated carrier frequency envelope regardless of whether the envelope is rising or falling and the current flow through the load is uniform thereby obviating the necessity of a filter circuit which increases the cost and bulk as well as provides only an approximate measure of envelope amplitude.

Figure 4A:
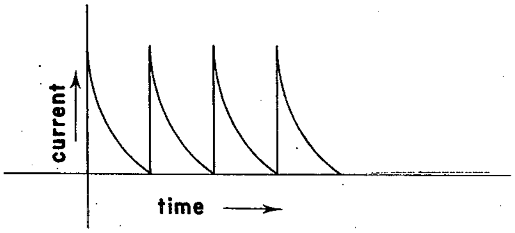
FIGURES 4A, 4B and 4C are curves showing the effects of varying capacitor time constants.
Figure 4B:
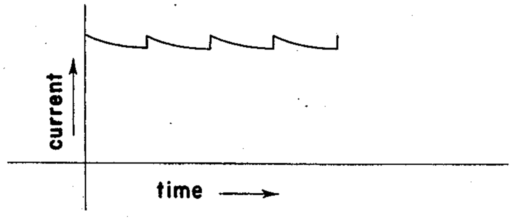
Figure 4C:
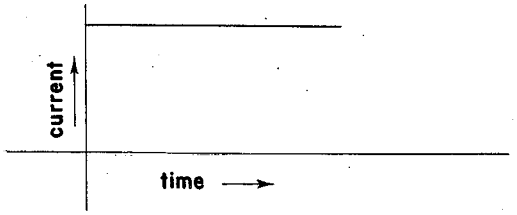

In FIGURE 4A is shown the discharge curve of a capacitor having a time constant approximately equal to the period of the carrier frequency (e.g., 1/70 of a second). A time constant of this or a shorter duration is desirable when the capacitors are connected to the amplifier so that the charge thereon will follow the envelope. A time constant of this duration would be obviously undesirable when connected to the load. In FIGURE 4B is shown a time constant of about ten periods of the carrier frequency (about 1/7 second) and in FIGURE 4C is shown a time constant of about 100 seconds (7000 periods of oscillation). With a time constant of 100 seconds the current through the load would be nearly uniform (FIGURE 4C) and a time constant of 1/7 second would have a ripple (FIGURE 4B). These time constants would be satisfactory for the load but unsatisfactory for the amplifier since the capacitor charge would not readily follow the envelope. In practice it is necessary to arrive at a compromise since the amplifier must have some finite output impedance (e.g., 35 ohms) and there is therefore a limit to the capacitive reactance increase since the time constant would become too large. However, it has been found that extremely satisfactory time constants can be obtained by use of the switching circuits of the present invention.

Figure 5:
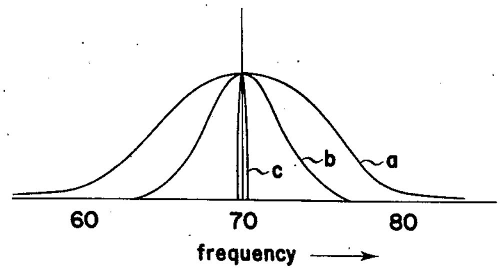
FIGURE 5 is a graph showing curves of the system frequency response.

In FIGURE 5 is a graph illustrating the bandwidth or frequency response of the load when employing the time constants of FIGURES 4A, 4B and 4C. Curve "*a*" represents a 70 cycles per second frequency response which corresponds with the time period of 1/70 second (FIGURE 4A), curve "*b*" represents a 7 cycles per second frequency response which corresponds with a time period of 1/7 second (FIGURE 4B), and curve "*c*" represents a .01 cycle per second frequency response which corresponds with a 100 second time period (FIGURE 4C). For accurate envelope measurement it is desirable to employ the time constant having the minimum frequency response since it discriminates against the greatest number of non-synchronous side band frequencies. In view of this it can be seen that a large time constant provides both a smooth, effectively filtered D.C. current through the load and a small frequency response which discriminates against undesirable noise frequencies.

The following table shows by way of illustration the value of elements which have been used in operation of the present invention.

| Element: | Value |
|---|---|
| 27 | 1 micro farad. |
| 28 | 1 micro farad. |
| 21 | 100,000 ohms. |
| 17 | 35 ohms (output impedance). |
| 11 | 70 cycles per second. |
| 15 | .01 to 1 cycle per second (modulation frequency). |

It is to be understood in connection with this invention that the embodiments shown are only exemplary, and that various modifications can be made in construction and arrangement within the scope of the invention as defined in the appended claims.

What is claimed is:

1. A device for rectifying an amplitude modulated carrier signal comprising a first capacitor, a second capacitor, a load, switching means connecting said first capacitor to said amplitude modulated carrier signal when the carrier signal is positive and to said load when said carrier signal is negative and connecting said second capacitor to said amplitude modulated carrier signal when the carrier signal is negative and to said load when said carrier signal is positive.

2. A device for rectifying an amplitude modulated carrier signal comprising a first capacitor, a second capacitor a load, switching means connecting said first capacitor to said amplitude modulated carrier signal when the carrier signal is positive and to said load when said carrier signal is negative and connecting said second capacitor to said amplitude modulated carrier signal when the carrier signal is negative and to said load when said carrier signal is positive, wherein the time constants of each said capacitors when connected to said load are large and when connected to said modulated carrier signal are small whereby the charge on each of said capacitors rapidly follow said modulated carrier signal and the current through said load is uniform.

References Cited in the file of this patent

UNITED STATES PATENTS

| | | |
|---|---|---|
| 2,295,293 | Rogers | Sept. 8, 1942 |
| 2,679,584 | Macdonald | May 25, 1954 |
| 2,832,888 | Houston | Apr. 29, 1958 |